Oct. 30, 1934.  C. S. CRAFTS  1,978,567
FOLDING MECHANISM
Filed June 28, 1933
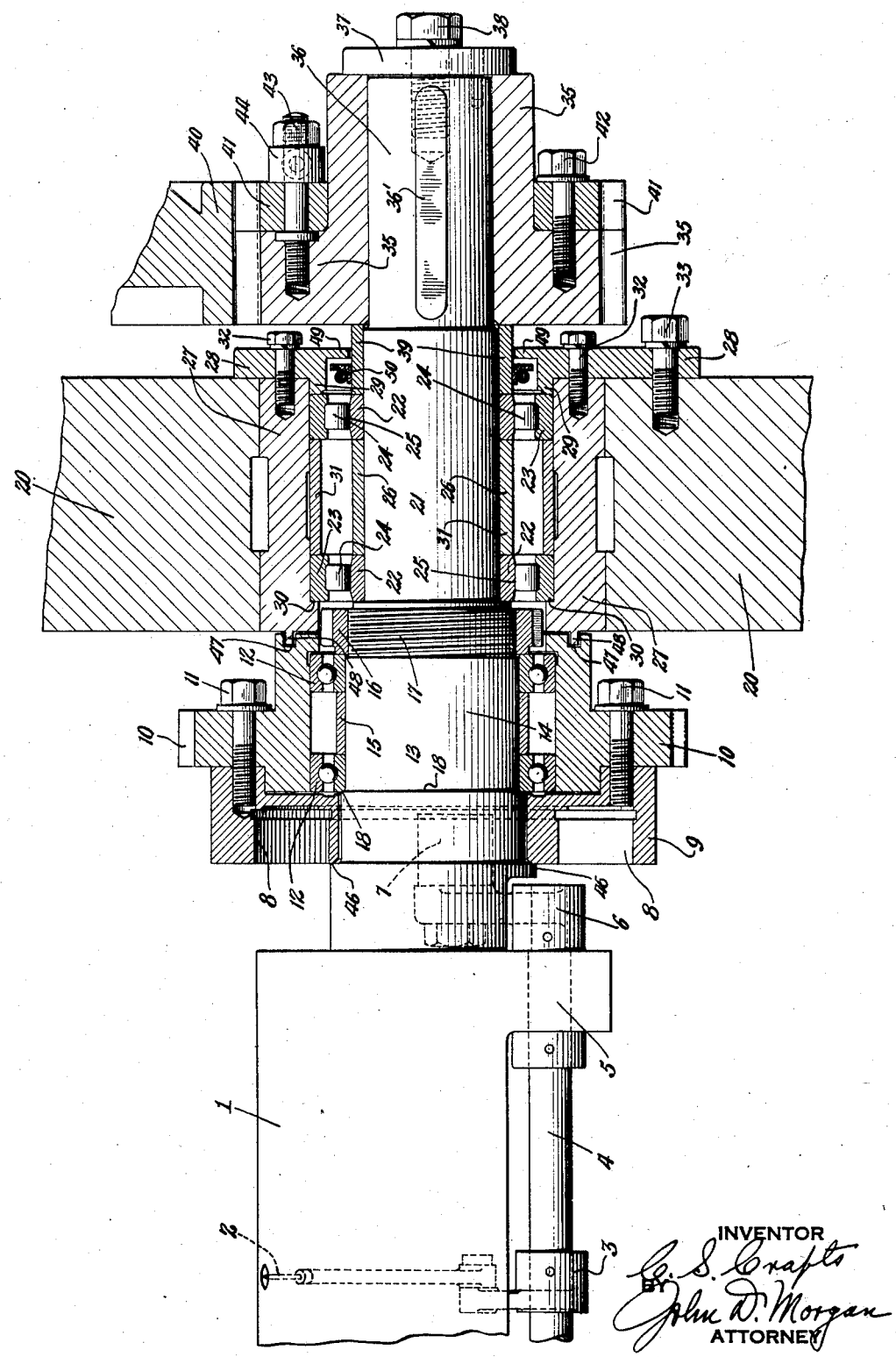
INVENTOR
C. S. Crafts
BY John D. Morgan
ATTORNEY Patented Oct. 30, 1934

1,978,567

UNITED STATES PATENT OFFICE 1,978,567

FOLDING MECHANISM

Curtis S. Crafts, Oak Park, Ill., assignor to Goss Printing Press Company, Chicago, Ill., a corporation of Illinois Application June 28, 1933, Serial No. 677,997

12 Claims. (Cl. 164—66)

The present invention relates to rotary folding mechanisms and more particularly to a novel and improved cylinder mounting for use in connection with such mechanism.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

The single figure of the drawing is a fragmentary longitudinal section taken along the central portion of a cutting cylinder and its mounting and showing a typical embodiment of the present invention.

The present invention has for its object the provision of a mounting for the cylinders of the folding mechanism which facilitates disassembly and reassembly of the mechanism. The invention also provides a bearing mounting for such cylinders which insures that it will be reassembled without destroying the bearing fits. Another object is the provision of a cylinder mounting permitting easy removal and replacement of the pin cams and gears, and accommodating axial expansion of the cylinder and shaft.

In accordance with one embodiment of the present invention, the cylinder is rotatably mounted in the frame by means of a pair of anti-friction bearings having inner and outer races which are relatively axially movable. The usual driving gear is mounted on the end of the cylinder shaft, while the cam, for operating the pins, grippers or other mechanism on the cylinder, is relatively rotatable with respect to the cylinder and frame, and is mounted on the shaft by means of a pair of anti-friction bearings having a sufficiently large internal diameter to slip over the inner race of the main cylinder bearings. The inner race of the main bearings is preferably a press fit on the cylinder shaft, while the outer race of the cam bearings is preferably a press fit in the cam and is loose on the shaft, being held thereto by means of a threaded collar which presses the inner race against a shoulder on the shaft. By removing the gear, the cylinder and shaft, together with the inner race of the main bearing, may be removed by axial movement, and the cam, together with its anti-friction bearing, may then be slipped off the end of the shaft.

It will be understood that the foregoing general description and the following detailed description as well are exemplary and explanatory of the invention but are not restrictive thereof.

Referring now in detail to the illustrative embodiment of the invention one end of which is shown in the accompanying drawing, the cutting cylinder 1 of a rotary folding mechanism is provided with the usual sheet-taking pins 2 adapted to be operated by oscillation of arms 3 on a shaft 4 mounted in suitable bearings 5 at the ends of the cylinder. At one end shaft 4 projects through the end of the cylinder and carries an arm 6 on which is rotatably mounted a cam roller 7 running in the cam track 8 of pin operating cam 9. Cam 9 is mounted on one side face of gear 10 to which it is held by screws 11 passing through apertures in the gear and threaded into cam 9.

On its interior, gear 10 is provided with a cylindrical bore into which are fitted with a press fit the outer races of anti-friction bearings 12, the two bearings being at opposite ends of the cylindrical bore. The inner races of bearings 12 are a push fit on cylinder shaft 14 and are held apart by means of spacer ring 15. A threaded collar 16 on a threaded portion 17, of slightly smaller diameter than portion 13 of shaft 14, serves to press the bearings 12 inwardly towards the cylinder 1 and against shoulder 18. At one end, cylinder 1 is rotatably mounted by means of its shaft 14 in the side frame 20, and is also rotatably mounted at its other end in a similar side frame, not shown. The portion 21 of the shaft 14 which is within the frame is of considerably less diameter than the portion 13, and carries the spaced apart inner races of bearings 22. Bearings 22 comprise outer races 23 having a groove to receive the rollers 24 which are retained in the groove by suitable retaining rings, and inner races 25 having a track with a cylindrical surface. By axial movement, the inner race 25 may be removed from the rollers 24 and outer race 23, these bearings also serving to permit axial expansion of the shaft or cylinder.

The inner races 25 are preferably a press fit on the portion 21 of shaft 14, and are spaced apart by a spacer ring 26 positioned between them. The outer races are mounted in the cylindrical bore of sleeve 27 which is mounted in a corresponding cylindrical bore in the side frame 20. The outer races 23 are held in position by means of flange 28 having an inwardly extending lip 29 which presses against the outer face of the outer race, and holds the outer race of the inner bearing in its proper position against shoulder 30 by cooperation with spacer ring 31. Flange 28 is secured to sleeve 27 by means of bolts 32. Sleeve 27 is held in proper position in frame 20 by means of bolts 33 passing through flange 28 and threaded into the frame.

Means are provided for driving shaft 14, and thereby cylinder 1, and for this purpose a gear 35 is mounted on the reduced end portion 36 of shaft 14, and is secured thereto by keys 36', cap 37 and cap screw 38 which passes through the cap and is threaded into the end of the shaft, pressing the inner face of the gear against collar 39 which in turn presses against the inner race of the outer bearing 22. Gear 35 is driven in the usual manner by a press-driven gear 40.

Means are also provided for eliminating backlash between gears 35 and 40, and for this purpose a relatively narrow ring gear 41 is mounted coaxial with gear 35 and is secured thereto by means of cap screws 42 and bolts 43. Suitable means 44 may be provided for minutely angularly moving ring gear 41 with reference to the main gear 35, to throw the teeth of these two gears slightly out of line with each other.

Means are also provided for retaining lubricant within the bearings, and for this purpose cam 9 is fitted quite closely to shaft 14 along the inner cylindrical bore of the cam, and at shoulder 46. The inner portion of cam 9 is also of considerably less diameter than the cylindrical bore of gear 10, so that centrifugal force tends to keep the lubricant within the bore of gear 10. The outer face of gear 10 is provided with an annular groove 47 which fits over a corresponding annular tongue 48 providing a relatively tight oil seal. Flange 28 is provided with a portion 49 projecting radially inward and into close proximity to collar 39, and between collar 39 and flange 28 is a sealing ring 50 preventing leakage of lubricant past the flange portion 49. Lubricant may be supplied to all of the bearings by means of a suitable oil pipe or hole passing through sleeve 27 and spacer 31 to communicate with the space between the bearings 22.

In order to disassemble the folding mechanism, as is necessary in the replacement of cam 9, it is only necessary to remove screw 38 and cap 37, thereby permitting gear 35 to be removed from the end of the shaft. Cylinder 1, shaft 14, cam 9 and gear 10 may then be moved axially of the shaft with respect to frame 20, the inner races 25 remaining in place on shaft 14 while the outer races 23 and the rollers 24, being held against falling by suitable retainers, remain in their sleeve 27. Threaded collar 16 may then be unscrewed, and gear 10 and cam 9 may then be slid off the end of the shaft and over races 25 without disturbing the fit of bearings 12. If desired, the outer races 23 and rollers 24 may be removed for cleaning by removing flange 28. The parts may, thereafter, be reassembled by performing the operations in the reverse order, and the correct fitting of the bearings is always assured.

Although in the illustrative embodiment the invention is shown in connection with the cutting cylinder of a rotary folding mechanism, the invention is also applicable to the folding cylinder of such a mechanism in which the cylinder is rotatable and is provided with a relatively rotatable pin or gripper operating cam.

The invention in its broader aspects is not limited to the specific mechanisms shown and described but departures may be made therefrom within the scope of the accompanying claims without departing from the principles of the invention and without sacrificing its chief advantages.

What I claim is:

1. In a folding mechanism, the combination of a frame, a cylinder rotatably mounted by its shaft in said frame, a cam rotatable on said shaft relatively to said cylinder, a ball bearing mounting said cam on said shaft, a roller bearing formed of separable coaxial parts and having its innermost part fast on said shaft, the inner race of said ball bearing being sufficiently large to slip over the inner part of said roller bearing, whereby the cam and bearings may be removed without destroying their fit.

2. In a folding mechanism, the combination of a frame, a cylinder rotatably mounted by its shaft in said frame, a cam rotatable on said shaft relatively to said cylinder, anti-friction bearings, having inner and outer races mounted on said shaft, one of the bearings journalling the shaft in said frame, another journalling the cam on said shaft, and the outer bearing having its races separable whereby the shaft may be moved axially in the frame for disassembly, and the inner bearing and cam may be slipped over said shaft and inner race of said outer bearing.

3. In a folding mechanism, the combination of a frame, a cylinder rotatably mounted by its shaft in said frame, a cam rotatable on said shaft relatively to said cylinder, anti-friction bearings journalling the shaft in said frame and the cam on said shaft, said shaft bearing having separable races with the inner race fast on said shaft, the cam bearing having its inner race sufficiently large to slip over the inner race of the shaft bearing and being fast to said cam whereby the shaft, frame and cam may be separated without destroying the bearing fits.

4. In a folding mechanism, the combination of a frame, a cylinder rotatably mounted by its shaft in said frame, a cam rotatable on said shaft relatively to said cylinder, an anti-friction bearing journalling said shaft in said frame, said bearing having axially separable races, the inner race being fast on said shaft and smaller than the center hole of said cam whereby the cam and shaft may be disassembled from each other and the frame by relative axial movement, and the shaft may move axially while running.

5. In a folding mechanism, the combination of a frame, a cylinder having a shaft projecting through said frame, a cam rotatable on said shaft between said cylinder and frame and a gear outside said frame and on said shaft, a pair of roller bearings having axially separable races journalling said shaft in said frame, the inner races being fast on said shaft, a pair of ball bearings journalling said cam on said shaft, said ball bearings having their outer races fast in said cam, the interior diameter of said bearing being sufficient to permit it to be slipped over the inner races of said roller bearings, whereby the parts may be disassembled by relative axial movement of said gear, shaft and frame, and the shaft may move axially in said frame in operation.

6. In a folding mechanism, the combination of a frame, a cylinder having a shaft projecting through said frame, a cam rotatable on said shaft between said cylinder and frame and a gear outside said frame and on said shaft, a pair of roller bearings having axially separable races journalling said shaft in said frame, the inner races being fast on said shaft, a pair of ball bearings journalling said cam on said shaft, said ball bearings having their outer races fast in said cam, the interior diameter of said bearing being sufficient to permit it to be slipped over the inner races of said roller bearings, whereby the parts may be disassembled by relative axial movement of said gear, shaft and frame, without disturbing the bearing fits, and the shaft may move axially in said frame in operation.

7. In a folding mechanism, the combination of a frame, a cylinder rotatably mounted by its shaft in said frame, a cam rotatable on said shaft relatively to said cylinder, a roller bearing journalled on said shaft in said frame and permitting axial movement of said shaft, an anti-friction bearing journalled in said cam on said shaft and having a sufficiently large internal diameter to be slipped over said shaft, the roller bearing and anti-friction bearing being mounted with a communicating space between them into which lubricant may be introduced, and means for retaining said lubricant within the bearing space.

8. In a folding mechanism, a gear driven cam to be rotatably mounted on a rotatable shaft and comprising a gear having a cylindrical bore with an inwardly extending flange at one end thereof, a cam secured to the side face of said gear at the other end of said bore, and extending inwardly beyond said bore, a pair of anti-friction bearings and a spacer ring therefor mounted in said bore and between said cam and flange.

9. In a folding mechanism, the combination of a frame, a cylinder having its shaft rotatably mounted in said frame, and a cam rotatably mounted on said shaft and rotatable with respect to said frame, anti-friction bearings between said cam and shaft and between said shaft and frame, an oil seal between said cam and frame, and oil retaining means at the ends of said bearings.

10. In a mechanism of the kind described, the combination of a frame, a cylinder having its shaft rotatably mounted in said frame, and a rotatable member mounted on said shaft and rotatable with respect to said frame, anti-friction bearings between said member and shaft and between said shaft and frame, an oil seal between said member and frame, and oil retaining means at the ends of said bearings.

11. In a mechanism of the kind described, the combination of a frame, a cylinder rotatably mounted by its shaft in said frame, a member rotatable on said shaft relatively to said cylinder, a ball bearing mounting said member on said shaft, a roller bearing formed of separable coaxial parts and having its innermost part fast on said shaft, the inner race of said ball bearing being sufficiently large to slip over the inner part of said roller bearing, whereby the member and bearings may be removed without destroying their fit.

12. In a mechanism of the kind described, the combination of a frame, a cylinder rotatably mounted by its shaft in said frame, a member rotatable on said shaft relatively to said cylinder, anti-friction bearings journalling the shaft in said frame and the member on said shaft, said shaft bearing having separable races with the inner race fast on said shaft, the member bearing having its inner race sufficiently large to slip over the inner race of the shaft bearing and being fast to said member whereby the shaft, frame and member may be separated without destroying the bearing fits.

CURTIS S. CRAFTS.